US011525370B2

(12) United States Patent
Lukovic et al.

(10) Patent No.: US 11,525,370 B2
(45) Date of Patent: Dec. 13, 2022

(54) METHOD AND SYSTEM FOR MITIGATING ROTOR BOW IN A TURBO MACHINE

(71) Applicants: General Electric Company, Schenectady, NY (US); GE Avio S.r.l., Turin (IT)

(72) Inventors: Bojan Lukovic, Liberty Township, OH (US); Michael John Murray, Loveland, OH (US); Christian Michael Fernholz, Liberty Township, OH (US); Davide Lauria, Airasca (IT); Rocco Pellettieri, Turin (IT); Steven Edward Nolte, Harrison, OH (US)

(73) Assignees: General Electric Company, Schenectady, NY (US); GE Avio S.r.l., Turin (IT)

( * ) Notice: Subject to any disclaimer, the term of this patent is extended or adjusted under 35 U.S.C. 154(b) by 0 days.

(21) Appl. No.: 17/471,576

(22) Filed: Sep. 10, 2021

(65) Prior Publication Data

US 2022/0154594 A1 May 19, 2022

(30) Foreign Application Priority Data

Nov. 13, 2020 (IT) .................. 102020000027293

(51) Int. Cl.
*F01D 19/00* (2006.01)
(52) U.S. Cl.
CPC ........ *F01D 19/00* (2013.01); *F05D 2270/114* (2013.01)

(58) Field of Classification Search
CPC ..................... F01D 19/00; F05D 2270/114
See application file for complete search history.

(56) References Cited

U.S. PATENT DOCUMENTS

| 4,437,809 A | 3/1984 | Nutter |
| 4,507,926 A | 4/1985 | Teckentrup et al. |
| 4,905,810 A | 3/1990 | Bahrenburg |
| 5,088,341 A | 2/1992 | Hyde et al. |
| 8,776,530 B2 | 7/2014 | Shirooni et al. |
| 8,820,046 B2 | 9/2014 | Ross et al. |
| 8,845,275 B2 | 9/2014 | Short et al. |
| 9,664,070 B1 | 5/2017 | Clauson et al. |
| 10,508,567 B2 | 12/2019 | Stachowiak et al. |
| 11,022,004 B2 | 6/2021 | Duce et al. |
| 2017/0234238 A1 | 8/2017 | Schwarz et al. |
| 2017/0363012 A1 | 12/2017 | Clauson et al. |
| 2018/0010523 A1 | 1/2018 | Harder et al. |
| 2018/0283199 A1* | 10/2018 | Karnofski ............... F01D 25/24 |
| 2019/0186359 A1 | 6/2019 | Stevenson |

FOREIGN PATENT DOCUMENTS

WO WO2020/157432 A1 1/2020

* cited by examiner

*Primary Examiner* — Jacob M Amick
*Assistant Examiner* — Charles J Brauch
(74) *Attorney, Agent, or Firm* — Dority & Manning, P.A.

(57) ABSTRACT

An aspect of the present disclosure is directed to a method for mitigating rotor bow in a turbo machine. The method includes rotating a rotor over a first period of time; discontinuing rotation of the rotor for a second period of time; and iterating, over an overall period of time, rotation of the rotor over the first period of time and discontinuing rotation of the rotor for the second period of time.

20 Claims, 3 Drawing Sheets

METHOD AND SYSTEM FOR MITIGATING ROTOR BOW IN A TURBO MACHINE

PRIORITY INFORMATION

The present application claims priority to Italian Patent Application Number 102020000027293 filed on Nov. 13, 2020.

FIELD

The present subject matter relates generally to turbo machine bowed rotor mitigation systems and methods.

BACKGROUND

Following shutdown of a turbo machine engine, hot air rises to the top of the engine, thereby unevenly cooling the rotor shaft. The uneven cooling of the rotor shaft results in the top of the shaft being longer than the bottom, thereby creating a condition called bowed rotor. Bowed rotor can cause rotor blades to undesirably contact seals and stator surfaces, resulting in damage to the blades and/or the surrounding surfaces. Bowed rotor may also result in high vibration levels during subsequent engine startup, which may result in blade and static surface damage, bearing system damage, and other damage to the engine.

Known systems and methods for reducing or mitigating rotor bow in rotor shafts may involve compromises between wait periods for the rotor to cool or complex systems that add weight and/or wear to the engine.

As such, there is a need for improved systems and methods for mitigating rotor bow.

BRIEF DESCRIPTION

Aspects and advantages of the invention will be set forth in part in the following description, or may be obvious from the description, or may be learned through practice of the invention.

An aspect of the present disclosure is directed to a method for mitigating rotor bow in a turbo machine. The method includes rotating a rotor over a first period of time; discontinuing rotation of the rotor for a second period of time; and iterating, over an overall period of time, rotation of the rotor over the first period of time and discontinuing rotation of the rotor for the second period of time.

In various embodiments, rotating the rotor over the first period of time includes partially rotating the rotor over the first period of time. In one embodiment, rotating the rotor over the first period of time is for 180 degrees+/−25 degrees for the first period of time. In another embodiment, partially rotating the rotor is for the first period of time defining approximately 30 seconds.

In still various embodiments, the method further includes providing a motive force to the rotor to induce partial rotation of the rotor. In one embodiment, the motive force is equal to or less than a threshold corresponding to a desired maximum torque applied at the rotor during a non-actively lubricated condition. In another embodiment, the threshold is 50 pounds-force or less for the first period of time. In yet various embodiments, providing the motive force to the rotor includes providing the motive force to the rotor intermittently to induce partial rotation of the rotor for the first period of time. In one embodiment, providing the motive force to the rotor is pulsed for the first period of time.

In still yet various embodiments, iterating rotation of the rotor further includes iterating, over a first frequency, rotation of the rotor for the first period of time and discontinuing rotation of the rotor for the second period of time; and iterating, over a second frequency, rotation of the rotor for the first period of time and discontinuing rotation of the rotor for an altered second period of time different from the second period of time over the first frequency. In various embodiments, the change in the second period of time between first frequency and the second frequency includes increasing the second period of time at the second frequency. In one embodiment, increasing the second period of time at the second frequency corresponds to a change in rate of heat release at the rotor over time.

In one embodiment, discontinuing rotation of the rotor is for the second period of time between approximately $\frac{1}{10}^{th}$ of an hour and approximately $\frac{1}{5}^{th}$ of an hour.

In another embodiment, the overall period of time is between 4 hours and 12 hours.

In still another embodiment, the overall period of time corresponds to a threshold temperature at the rotor assembly, wherein intermittent rotation of the rotor continues iteratively until the rotor assembly is at or below the threshold temperature.

Another aspect of the present disclosure is directed to a turbo machine including a shaft drivingly connecting a compressor and a turbine, in which the shaft, compressor, and turbine together define a rotor assembly; a turning system configured to provide a motive force to rotate the rotor assembly; and a controller configured to perform operations. The operations include rotating, via the turning system, the rotor assembly over a first period of time; discontinuing rotation of the rotor for a second period of time; and iterating, over an overall period of time, rotation of the rotor assembly over the first period of time and discontinuing rotation of the rotor for the second period of time.

In various embodiments, the operations further include providing, via the turning system, a motive force to the rotor assembly to induce partial rotation of the rotor assembly. In one embodiment, providing the motive force to the rotor assembly comprises providing, via the turning system, the motive force to the rotor assembly intermittently to induce partial rotation of the rotor assembly for the first period of time.

In one embodiment, iterating rotation of the rotor further includes iterating, over a first frequency, rotation of the rotor assembly for the first period of time and discontinuing rotation of the rotor assembly for the second period of time; and iterating, over a second frequency, rotation of the rotor assembly for the first period of time and discontinuing rotation of the rotor assembly for an altered second period of time different from the second period of time over the first frequency.

In another embodiment, rotating the rotor assembly over the first period of time is for 180 degrees+/−25 degrees over the first period of time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
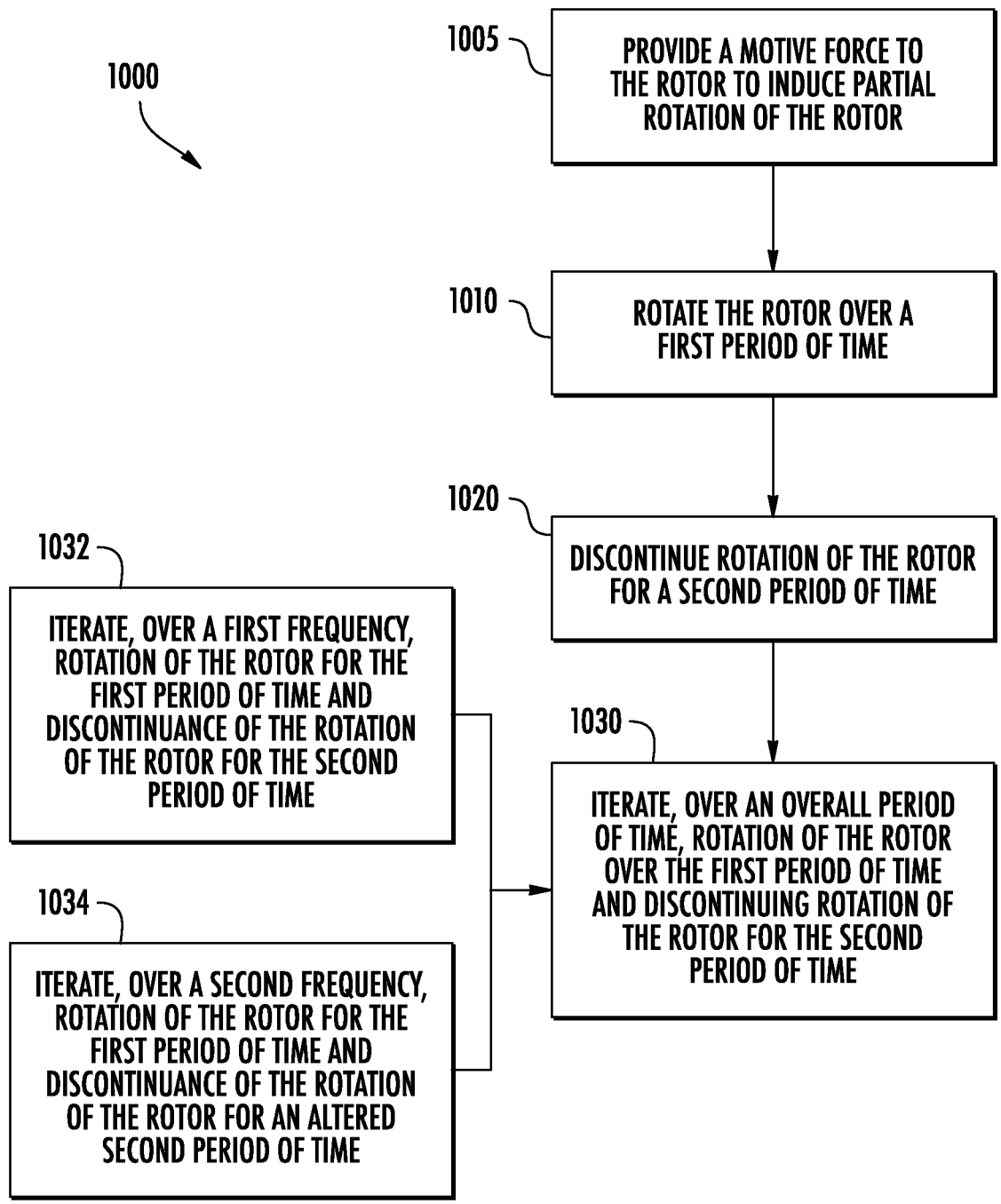
FIG. 1 is a flowchart outlining exemplary steps of a method for mitigating rotor bow at a turbo machine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Improved systems and methods for mitigating rotor bow are provided herein. The systems and methods shown and described herein include intermittent turning of the rotor at a frequency and over a period of time to improve cooling and/or reduce the thermal gradient across the rotor. The embodiments provided herein improve over known systems and methods that include continuous rotor turning over a period of time. As lubrication systems are generally inactive or passive following shutdown of the engine, continuous turning of the rotor may occur without direct lubrication and/or no hydrodynamic oil film formation for the gear system. Furthermore, turning the rotor may generally include high contact pressure on gears at the gear system. As such, continuous turning of the rotor may accelerate wear and deterioration of the gear system.

In contrast, the systems and methods provided herein for intermittent turning of a rotor to mitigate rotor bow include performing a partial rotation (i.e., less than one revolution) of the rotor over a first period of time then discontinuing rotation of the rotor for a second period of time. The system and method iterates over a frequency the partial rotation over the first period of time and the discontinuation of rotation for the second period of time. In one embodiment, the frequency includes a first frequency defining the first period of time and the second period of time and a second frequency defining the first period of time (e.g., the first period of time equal in the first frequency and the second frequency) and an altered second period of time, such as a third period of time, different at the second frequency than the first frequency (i.e., the period of time over which rotation is discontinued is different at the first frequency and the second frequency). The method and system includes iterations of the partial rotation and discontinuation for an overall period of time.

The intermittent partial rotation and non-rotation of the rotor mitigates wear and deterioration at the gear system, such as by minimizing an amount of time of high contact pressure on the gears of the gear system, or further by minimizing the amount of time of high contact pressure on the gears of the gear system absent of active lubrication of the gear system.

Figure 2:
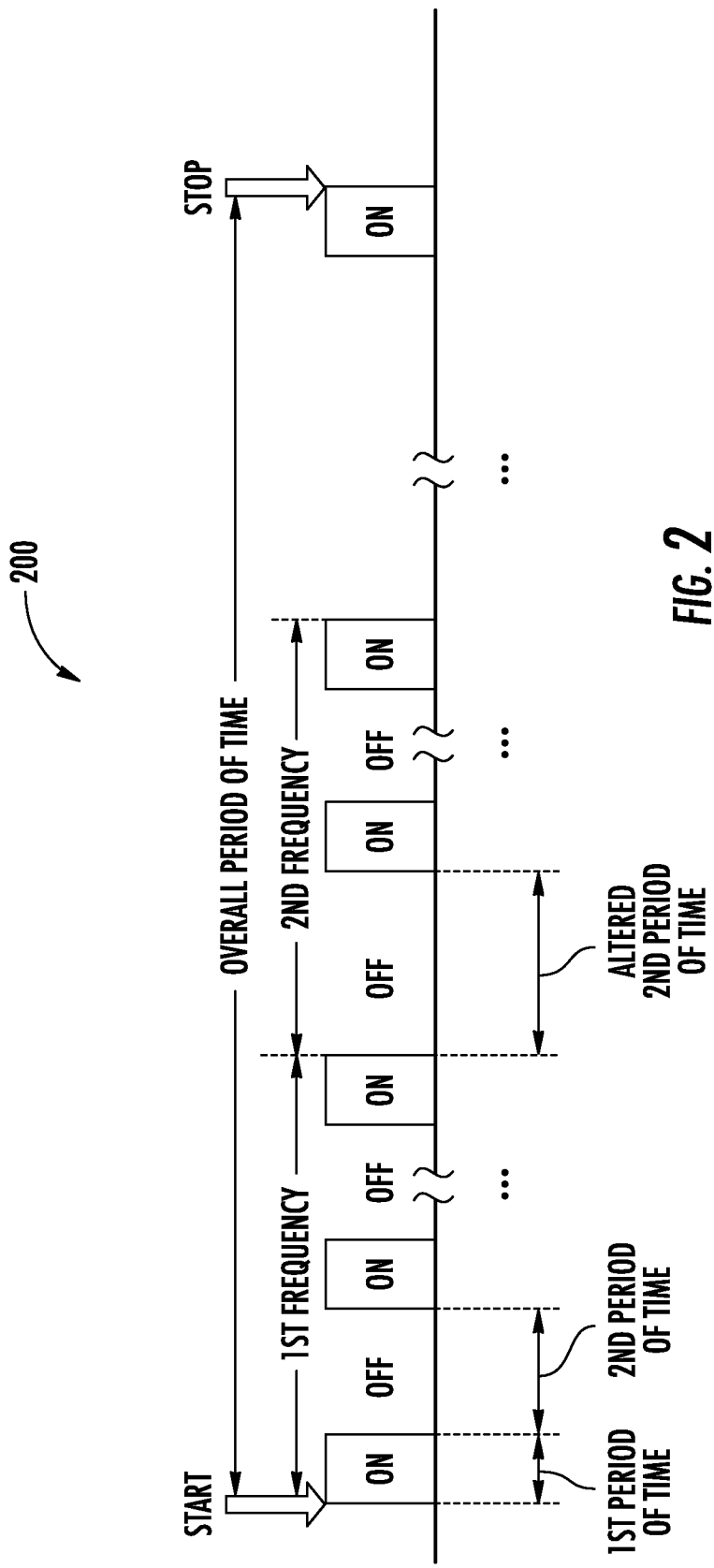
FIG. 2 is a graph depicting intermittent rotation of a rotor assembly according to an aspect of the method outlined in FIG. 1.

Referring now to the drawings, FIG. 1 is a flowchart outlining exemplary steps of a method for mitigating rotor bow at a turbo machine (hereinafter, "method 1000"). The method 1000 may be implemented on turbo machines in general, including those with air turbine starters, generators, or other rotor turning systems. FIG. 2 provides an exemplary graph 200 depicting a schematic implementation of the method 1000. Although the method 1000 may be discussed in regard to the exemplary schematic embodiment of the turbo machine provided in regard to FIG. 3, it should be appreciated that the method 1000 may be implemented at turbo machines of other configurations including a rotor turning system.

Referring to FIG. 1, and the exemplary graph 200 depicted in FIG. 2, the method 1000 includes at 1010 rotating the rotor over a first period of time; at 1020 discontinuing rotation of the rotor for a second period of time; and at 1030 iterating, over an overall period of time, rotation of the rotor over the first period of time and discontinuing rotation of the rotor for the second period of time.

In various embodiments, the method 1000 at 1010 includes partial rotation of the rotor over the first period of time. In one embodiment, the method 1000 at 1010 includes rotating the rotor 180 degrees+/−25 degrees for the first period of time. In another embodiment, the method 1000 at 1010 includes partial rotation of the rotor for approximately 30 seconds. In still another embodiment, partial rotation of the rotor is at a rate of approximately 1 revolution per minute over the first period of time of approximately 30 seconds.

In still various embodiments, such as generally depicted in the graph 200 in FIG. 2, discontinuing rotation of the rotor for the second period of time at step 1020 is for the second period of time defining approximately $\frac{1}{10}^{th}$ of an hour or greater. In one embodiment, the second period of time is between approximately $\frac{1}{10}^{th}$ of an hour and approximately $\frac{1}{5}^{th}$ of an hour.

In still yet various embodiments, the method 1000 at 1030 includes iterating the steps at 1010 and 1020 over the overall period of time defining approximately 8 hours. In one embodiment, the method 1000 at 1030 defines the overall period of time between 4 hours and 12 hours. In another embodiment, the method 1000 at 1030 defines the overall period of time between 6 hours and 10 hours.

In another embodiment, the method 1000 further includes at 1005 providing a motive force to the rotor to induce partial rotation of the rotor. In one embodiment, providing the motive force is not greater than a threshold corresponding to a desired maximum torque exerted at the rotor during a non-lubricated, passively lubricated, or otherwise non-actively lubricated condition. In one embodiment, the threshold torque is 50 pounds-force or less. In another embodiment, the threshold torque is 50 pounds-force or less for the first period of time, such as provided in regard to the method 1000 at 1010.

In still another embodiment, the providing the motive force to the rotor at 1005 is provided to the rotor intermittently to induce partial and unsteady rotation of the rotor for the first period of time at 1010. As such, the method 1000 at 1005 may include providing the motive force to the rotor to induce partial rotation at step 1010 in which rotation is pulsed for the first period of time.

In various embodiments, the method 1000 further includes at 1032 iterating, over a first frequency, rotation of the rotor for the first period of time and discontinuing rotation of the rotor for the second period of time and at 1034 iterating, over a second frequency, rotation of the rotor for the first period of time and discontinuing rotation of the rotor for an altered second period of time, (e.g., a third period of time) different from the second period of time. In still various embodiments, the method 1000 further includes further iterations of the rotation and discontinuance over a plurality of frequencies over the overall period of time.

Referring still to the method 1000 at 1030, 1032, and 1034, the change in period of time for which rotation of the rotor is discontinued (i.e., the rotor is at rest) includes increasing the second period of time at each subsequent iteration. The increase in the second period of time at each subsequent iteration may correspond to the change in rate of heat release at the rotor over time. For example, as the rotor cools over the overall period of time and with each partial rotation of the rotor, the amount of time between each subsequent rotation (i.e., the second period of time) may increase corresponding to the decreased thermal energy release from the rotor over time. Altering, such as increasing, the period of time (i.e., the second period of time) between each subsequent rotation of the rotor decreases undesired gear and gear system wear and deterioration by limiting the quantity of rotations and the amount of time the rotor is rotating without active lubrication to the gear system.

Figure 3:
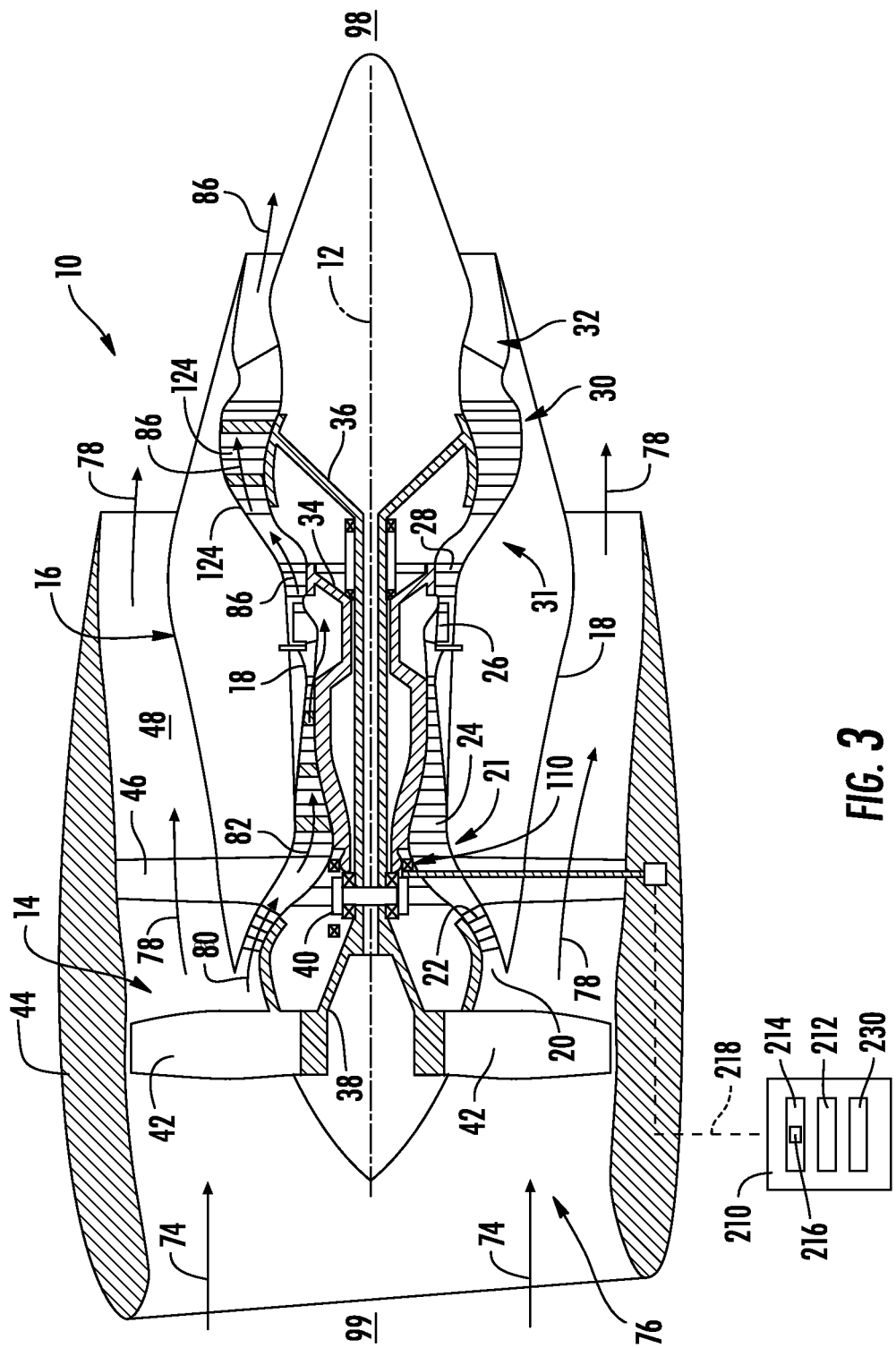
FIG. 3 is a schematic view of an exemplary embodiment of a turbo machine including a control system configured to execute embodiments of the method outlined in FIG. 1.

Referring now to FIG. 3, a schematic partially cross-sectioned side view of an exemplary turbo machine 10 herein referred to as "engine 10" as may incorporate various embodiments of the present invention. Various embodiments of the engine 10 may define a turbofan, turboshaft, turboprop, or turbojet gas turbine engine, including marine and industrial engines and auxiliary power units, or steam turbine engines, or other apparatuses including compressor assemblies. As shown in FIG. 3, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14.

The core engine 16 may generally include a substantially tubular outer casing 18 that defines a core inlet 20 to a core flowpath 70. The outer casing 18 encases or at least partially forms the core engine 16. The outer casing 18 encases or at least partially forms, in serial flow relationship, a compressor assembly 21 having a booster or low pressure (LP) compressor 22, a high pressure (HP) compressor 24, a combustion section 26, a turbine section 31 including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, the LP rotor shaft 36 may be connected to the fan shaft 38 via a reduction gear 40 such as in an indirect-drive or geared-drive configuration.

As shown in FIG. 3, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

It should be appreciated that combinations of the shaft 34, 36, the compressors 22, 24, and the turbines 28, 30 define a rotor assembly of the engine 10. For example, the HP shaft 34, HP compressor 24, and HP turbine 28 may define an HP rotor assembly of the engine 10. Similarly, combinations of the LP shaft 36, LP compressor 22, and LP turbine 30 may define an LP rotor assembly of the engine 10. Various embodiments of the engine 10 may further include the fan shaft 38 and fan blades 42 as the LP rotor assembly. In other embodiments, the engine 10 may further define a fan rotor assembly at least partially mechanically de-coupled from the LP spool via the fan shaft 38 and the reduction gear 40. Still further embodiments may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

The engine 10 further includes a turning system 110 configured to provide a motive force to one or more of the rotor assemblies to induce rotation. In various embodiments, the turning system 110 is configured to provide motive force to the rotor assembly to induce rotation, such as to provide initial airflow to start the engine 10. In another embodiment, the turning system 110 is configured to intermittently turn the rotor assembly according to the method 1000 outlined in FIG. 1 and graphically depicted in regard to FIG. 2. In various embodiments, the turning system 110 includes an air turbine starter configured to provide a force of fluid to the rotor assembly to induce rotation. In other embodiments, the turning system 110 may include a gear system, an electric machine such as a generator, a hydraulic or pneumatic system configured to induce rotation of the rotor assembly, or other appropriate system that may induce intermittent rotation of the rotor assembly. Although the method 1000 may particularly provide intermittent rotation of the HP rotor assembly, in various embodiments, the method 1000 may be utilized to provide intermittent rotation of the LP rotor assembly or an intermediate rotor assembly.

During operation of the engine 10, a flow of air, shown schematically by arrows 74, enters an inlet 76 of the engine 10 defined by the fan case or nacelle 44. A portion of air, shown schematically by arrows 80, enters the flowpath 70 at the core engine 16 through the core inlet 20 defined at least partially via the casing 18. The flow of air 80 is increasingly compressed as it flows across successive stages of the compressors 22, 24, such as shown schematically by arrows 82. The compressed air 82 enters the combustion section 26 and mixes with a liquid or gaseous fuel and is ignited to produce combustion gases 86. The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the bypass airflow passage 48, such as shown schematically by arrows 78.

Referring now to FIG. 3, the engine 10 may further include a controller 210 configured to execute steps of the method 1000. In various embodiments, the controller 210 can generally correspond to any suitable processor-based device, including one or more computing devices. For instance, FIG. 3 illustrates one embodiment of suitable components that can be included within the controller 210. As shown in FIG. 3, the controller 210 can include a processor 212 and associated memory 214 configured to perform a variety of computer-implemented functions. In various embodiments, the controller 210 may be configured to operate the engine 10 such as to intermittently rotate the rotor assembly including the HP shaft 34, HP compressor 24, and HP turbine 28, or, additionally or alternatively, the rotor assembly including the LP shaft 36, LP compressor 22, and LP turbine 30, such as provided in regard to method 1000. In still another embodiment, the controller 210 may be configured to operate the engine 10 to intermittently rotate the rotor assembly including one or more intermediate rotor assemblies.

In various embodiments, the controller 210 may be configured to send a control signal 218 to the turning system 110 such as to induce intermittent turning of the rotor assembly according to the method 1000 provided in regard to FIG. 1 and graphically depicted in regard to FIG. 2.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations, such as steps of the method 1000 for operating a compressor assembly outlined in regard to FIGS. 1-2 and further described in regard to the engine 10. In still various embodiments, the memory 214 may store the graph 200 or corresponding charts, tables, functions, look ups, etc. based thereon, such as described in regard to the method 1000.

Additionally, as shown in FIG. 3, the controller 210 may also include a communications interface module 230. In various embodiments, the communications interface module 230 can include associated electronic circuitry that is used to send and receive data. As such, the communications interface module 230 of the controller 210 can be used to receive data from one or more sensors at the engine 10, such as, but not limited to, rotational speed at the compressor assembly 21, a rate of acceleration or deceleration, or a change in rate of acceleration or deceleration, or air/surface temperature at the rotor assembly, such as a compressor exit temperature or combustion chamber temperature. In various embodiments, the overall period of time over which the rotor assembly is intermittently rotated is based on a threshold temperature at or near the rotor assembly. In one embodiment, intermittent rotation of the rotor assembly continues iteratively until the rotor assembly is at or below the threshold temperature.

In addition, the communications interface module 230 can also be used to communicate with any other suitable components of the engine 10, such as to receive data or send commands to/from the gear system 100 and/or the turning system 110, such as to enable or disable rotation of the rotor, or command a speed, frequency, mode, pulsation, etc. of the rotor such as described in regard to method 1000.

It should be appreciated that the communications interface module 230 can be any combination of suitable wired and/or wireless communications interfaces and, thus, can be communicatively coupled to one or more components of the engine 10 via a wired and/or wireless connection. As such, the controller 210 may obtain, determine, store, generate, transmit, or operate any one or more steps of the method 1000 at the engine 10, an apparatus to which the engine 10 is attached (e.g., an aircraft), or a ground, air, or satellite-based apparatus in communication with the engine 10 (e.g., a distributed network).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for mitigating rotor bow in a turbo machine, the method comprising:
   providing a motive force to a rotor assembly to induce partial rotation of the rotor assembly over a first period of time;
   discontinuing rotation of the rotor assembly for a second period of time; and
   iterating, over an overall period of time, rotation of the rotor assembly over the first period of time and discontinuing rotation of the rotor assembly for the second period of time,
   wherein the motive force is equal to or less than a threshold corresponding to a desired maximum torque applied at the rotor assembly during a non-actively lubricated condition.

2. The method of claim 1, wherein providing the motive force to the rotor assembly to induce the partial rotation of the rotor assembly over the first period of time comprises providing the motive force to the rotor assembly to induce a rotation of 180 degrees+/−25 degrees for the first period of time.

3. The method of claim 1, wherein the first period of time is approximately 30 seconds.

4. The method of claim 1, wherein the threshold is 50 pounds-force or less for the first period of time.

5. The method of claim 1, wherein providing the motive force to the rotor assembly to induce partial rotation of the rotor assembly over the first period of time comprises providing the motive force to the rotor assembly intermittently to induce partial rotation of the rotor assembly over the first period of time.

6. The method of claim 5, wherein providing the motive force to the rotor assembly to induce partial the rotation of the rotor assembly over the first period of time comprises providing the motive force that is pulsed for the first period of time.

7. The method of claim 1, wherein iterating rotation of the rotor assembly further comprises:
   iterating, over a first frequency, rotation of the rotor assembly for the first period of time and discontinuing rotation of the rotor assembly for the second period of time; and
   iterating, over a second frequency, rotation of the rotor assembly for the first period of time and discontinuing rotation of the rotor assembly for an altered second period of time different from the second period of time over the first frequency.

8. The method of claim 7, wherein the change in the second period of time between first frequency and the second frequency includes increasing the second period of time at the second frequency.

9. The method of claim 8, wherein increasing the second period of time at the second frequency corresponds to a change in rate of heat release at the rotor assembly over time.

10. The method of claim 1, wherein discontinuing rotation of the rotor assembly is for the second period of time between approximately 1/10th of an hour and approximately 1/5th of an hour.

11. The method of claim 1, wherein the overall period of time is between 4 hours and 12 hours.

12. The method of claim 1, wherein the overall period of time corresponds to a threshold temperature at the rotor assembly, wherein intermittent rotation of the rotor assembly continues iteratively until the rotor assembly is at or below the threshold temperature.

13. A turbo machine, the turbo machine comprising:
   a shaft drivingly connecting a compressor and a turbine, wherein the shaft, compressor, and turbine together define a rotor assembly;
   a turning system configured to provide a motive force to the rotor assembly to induce partial rotation of the rotor assembly over a first period of time; and
   a controller configured to perform operations, the operations comprising:
      rotating, via the turning system, the rotor assembly over a first period of time;
      discontinuing rotation of the rotor assembly for a second period of time; and
      iterating, over an overall period of time, partial rotation of the rotor assembly over the first period of time and discontinuing rotation of the rotor assembly for the second period of time,
   wherein the motive force is equal to or less than a threshold corresponding to a desired maximum torque applied at the rotor assembly during a non-actively lubricated condition.

14. The turbo machine of claim 13, wherein the operations further comprise:
   iterating, over a first frequency, rotation of the rotor assembly for the first period of time and discontinuing rotation of the rotor assembly for the second period of time; and
   iterating, over a second frequency, rotation of the rotor assembly for the first period of time and discontinuing rotation of the rotor assembly for an altered second period of time different from the second period of time over the first frequency.

15. The turbo machine of claim 14, wherein the change in the second period of time between first frequency and the second frequency includes increasing the second period of time at the second frequency.

16. The turbo machine of claim 13, wherein the first period of time is approximately 30 seconds.

17. The turbo machine of claim 13, wherein the threshold is 50 pounds-force or less for the first period of time.

18. The turbo machine of claim 13, wherein the turning system is further configured to pulse the motive force for the first period of time.

19. The turbo machine of claim 13, wherein rotating the rotor assembly over the first period of time is for 180 degrees+/−25 degrees over the first period of time.

20. The method of claim 3, wherein the threshold is 50 pounds-force or less for the first period of time.

* * * * *